(12) United States Patent
Fukushi

(10) Patent No.: US 10,014,513 B2
(45) Date of Patent: Jul. 3, 2018

(54) SECONDARY BATTERY

(71) Applicant: TOYOTA JIDOSHA KABUSHIKI KAISHA, Toyota-shi, Aichi-ken (JP)

(72) Inventor: Takanori Fukushi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 119 days.

(21) Appl. No.: 15/024,178

(22) PCT Filed: Sep. 23, 2014

(86) PCT No.: PCT/IB2014/001901
§ 371 (c)(1),
(2) Date: Mar. 23, 2016

(87) PCT Pub. No.: WO2015/044744
PCT Pub. Date: Apr. 2, 2015

(65) Prior Publication Data
US 2016/0233480 A1    Aug. 11, 2016

(30) Foreign Application Priority Data
Sep. 25, 2013  (JP) .................................. 2013-198137

(51) Int. Cl.
*H01M 2/34* (2006.01)
*H01M 10/0525* (2010.01)

(52) U.S. Cl.
CPC ....... *H01M 2/345* (2013.01); *H01M 10/0525* (2013.01); *H01M 2200/20* (2013.01); *H01M 2220/20* (2013.01)

(58) Field of Classification Search
CPC ............. H01M 2/345; H01M 10/0525; H01M 2200/20
See application file for complete search history.

(56) References Cited

U.S. PATENT DOCUMENTS

| | | |
|---|---|---|
| 2007/0172728 A1 | 7/2007 | Yamashita et al. |
| 2007/0212595 A1* | 9/2007 | Kim ............... H01M 2/0413 429/53 |
| 2008/0038627 A1 | 2/2008 | Yamauchi et al. |
| 2010/0159310 A1* | 6/2010 | Kim ............... H01M 2/0413 429/72 |
| 2010/0233529 A1 | 9/2010 | Nansaka et al. |

(Continued)

FOREIGN PATENT DOCUMENTS

| | | |
|---|---|---|
| JP | 2007-194167 A | 8/2007 |
| JP | 2008-66254 A | 3/2008 |
| JP | 2010-212034 A | 9/2010 |

(Continued)

*Primary Examiner* — Jonathan Crepeau
*Assistant Examiner* — Angela Martin
(74) *Attorney, Agent, or Firm* — Sughrue Mion, PLLC

(57) ABSTRACT

A secondary battery 1 includes a conductive member 130 that is provided in the secondary battery 1, and a current interrupt device 105 that is provided in the secondary battery 1 and has a reversal plate 120 that is welded to the conductive member 130. The conductive member 130 and the reversal plate 120 have thicknesses of T1 and T2, respectively, in the part in which the conductive member 130 and the reversal plate 120 are opposed to and in contact with each other, and the thicknesses T1 and T2 satisfy the relationship T1/T2<1.5.

2 Claims, 5 Drawing Sheets

(56) References Cited

U.S. PATENT DOCUMENTS

2011/0183163 A1 7/2011 Suzuki et al.
2011/0305929 A1 12/2011 Byun

FOREIGN PATENT DOCUMENTS

| JP | 2011-150966 A | 8/2011 |
| JP | 2011-258561 A | 12/2011 |
| JP | 2013-175435 A | 9/2013 |
| WO | 2012/176233 A1 | 12/2012 |

* cited by examiner

SECONDARY BATTERY

CROSS REFERENCE TO RELATED APPLICATIONS

This application is a National Stage of International Application No. PCT/IB2014/001901 filed Sep. 23, 2014, claiming priority based on Japanese Patent Application No. 2013-198137, filed Sep. 25, 2013, the contents of all of which are incorporated herein by reference in their entirety.

BACKGROUND OF THE INVENTION

1. Field of the Invention

The present invention relates to a secondary battery that is equipped with a current interrupt device.

2. Description of Related Art

Secondary batteries have been heretofore disclosed in, for example, Japanese Patent Application Publication No. 2010-212034 (JP 2010-212034 A), Japanese Patent Application Publication No. 2007-194167 (JP 2007-194167 A), Japanese Patent Application Publication No. 2011-150966 (JP 2011-150966 A), and Japanese Patent Application Publication No. 2011-258561 (JP 2011-258561 A).

SUMMARY OF THE INVENTION

A problem of the current interrupt devices that are used in secondary batteries of the related arts is that when the welding seam between the reversal plate and the conductive member undergoes solidification shrinkage after welding, the reversal plate, which has lower rigidity than the conductive member, is distorted. This leads to variations in the operating pressure of the current interrupt device.

Therefore, the present invention provides a secondary battery that can prevent a reversal plate of a current interrupt device from being distorted.

A secondary battery according to an aspect of the present invention includes a conductive member that is provided in the secondary battery, and a current interrupt device that is provided in the secondary battery and has a reversal plate that is welded to the conductive member. The conductive member and the reversal plate have thicknesses of T1 and T2, respectively, in the part in which the conductive member and the reversal plate are opposed to and in contact with each other, and the thicknesses T1 and T2 satisfy the relationship $T1/T2<1.5$.

In the secondary battery with the above configuration, the thickness T1 of the conductive member is sufficiently small compared to the thickness T2 of the reversal plate. Thus, even when solidification shrinkage occurs during welding, the conductive member can be deformed to absorb distortion. As a result, the reversal plate can be prevented from being distorted and the operating pressure of the current interrupt device can be therefore stabilized to a constant value.

In the secondary battery according to the aspect of the present invention, T2 may be 0.1 mm or greater and 1.0 mm or smaller. In this case, the reversal plate can be prevented from being distorted most effectively.

In the secondary battery according to the aspect of the present invention, the conductive member may have a recess in a surface on the same side thereof as the surface in contact with the reversal plate. In this case, because the gas that is generated during the welding diffuses to the outside through the recess, no gas remains in the welding seam and generation of voids therein can be prevented.

In the secondary battery according to the aspect of the present invention, the conductive member may have a recess in a surface on the opposite side thereof from the surface in contact with the reversal plate. In this case, the conductive member and the reversal plate can be in contact with other over a larger area compared to the case where the conductive member has a recess in a surface on the same side thereof as the surface in contact with the reversal plate. As a result, the reversal plate can be fixed to the conductive member more reliably.

In the secondary battery according to the aspect of the present invention, even when solidification shrinkage occurs during welding, the conductive member can be deformed to absorb distortion. As a result, the reversal plate can be prevented from being distorted and the operating pressure of the current interrupt device can be therefore stabilized to a constant value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
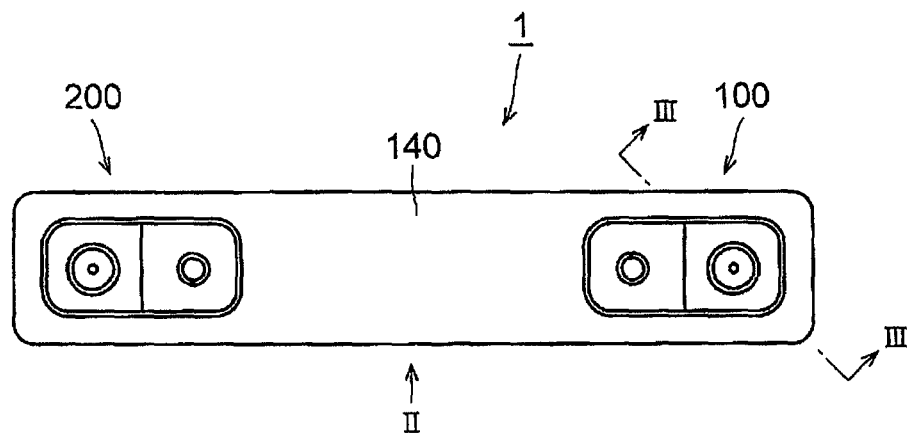
FIG. 1 is a plan view of a secondary battery according to a first embodiment.

Description is hereinafter made of embodiments of the present invention with reference to the drawings. In the following embodiments, the same or corresponding components are designated by the same reference numerals and their description is not repeated. The embodiments can be combined.

First Embodiment

Figure 2:
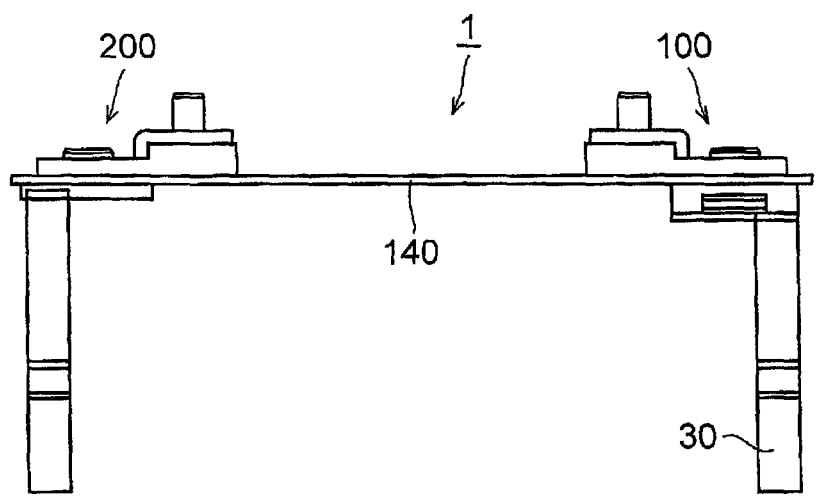
FIG. 2 is a diagram of the secondary battery that is shown in FIG. 1 as seen in the direction that is indicated by an arrow II.

FIG. 1 is a plan view of a secondary battery according to a first embodiment. FIG. 2 is a diagram of the secondary battery that is shown in FIG. 1 as seen in the direction that is indicated by an arrow II. Referring to FIG. 1 and FIG. 2, a secondary battery 1 employs a structure in which a positive electrode and a negative electrode are stacked via a separator that is impregnated with an electrolytic solution and rolled in a battery case 30.

A positive electrode 100 and a negative electrode 200 protrude from the battery case 30, and the positive electrode 100 and the negative electrode 200 are connected to a rolled body in the case. The battery case 30 can employ various shapes, such as rectangular solid and cylinder. The positive electrode 100 and the negative electrode 200 are provided through a sealing plate 140 that is provided at an end face of the battery case 30.

Figure 3:
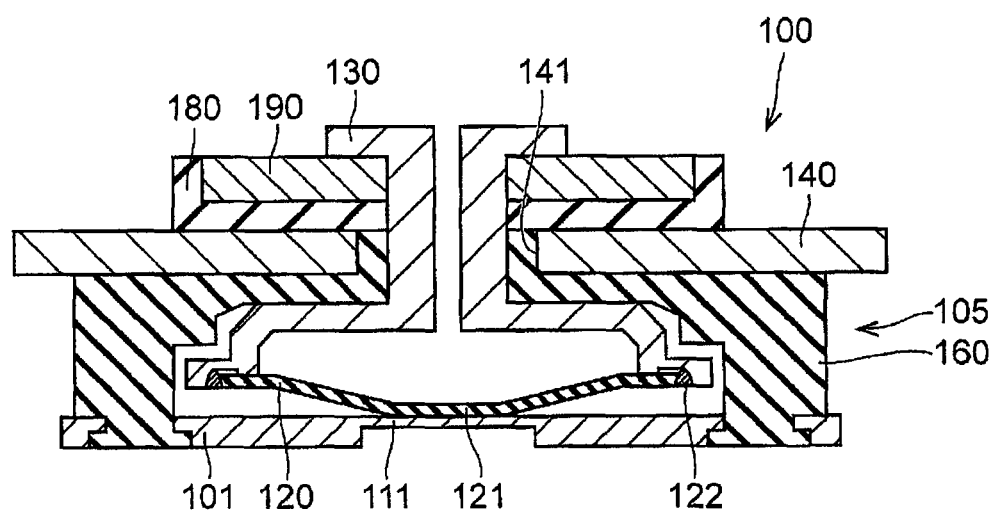
FIG. 3 is a cross-sectional view that is taken along the line in FIG. 1.

FIG. 3 is a cross-sectional view that is taken along the line in FIG. 1. Referring to FIG. 3, the positive electrode 100 of the secondary battery 1 is provided through the sealing plate 140. The sealing plate 140 has a through hole 141, and a conductive member 130 as a caulking part is fitted in the through hole 141.

A holder 160 is placed inside the sealing plate 140 (inside the battery case 30). The holder 160 serves to seal the through hole 141 to prevent the electrolytic solution in the battery case 30 from leaking to the outside.

The conductive member 130 has such a shape that its diameter is enlarged in the battery case 30, and a reversal plate 120 is welded to a large diameter portion thereof. The reversal plate 120 has a disk-like shape, and has a center portion that bulges in an axial direction.

A collector terminal 101 is disposed in the battery case 30. The collector terminal 101 is placed in position by the holder 160.

An electrolytic solution is enclosed in the battery case 30. As the type of the electrolytic solution, a non-aqueous electrolytic solution is used when a lithium ion battery is employed as the secondary battery 1. The non-aqueous electrolytic solution may contain, in addition to a non-aqueous solvent and a lithium salt as a supporting electrolyte, any additives. The secondary battery 1 may not necessarily be a lithium secondary battery as long as it is a secondary battery that uses an electrolytic solution.

A current interrupt device (CID) 105 includes the reversal plate 120. The reversal plate 120 has a pressure sensing surface 121 that is welded to a thin wall portion 111 of the collector terminal 101.

At least a part of a circumference portion of the conductive member 130 is covered with the holder 160. This can prevent a current from flowing from the electrolytic solution through a circumferential portion of the conductive member 130.

Before the current interrupt device 105 operates, a current flows through the collector terminal 101, the thin wall portion 111, the pressure sensing surface 121, the reversal plate 120 and the conductive member 130. As a result, electric power is supplied from the secondary battery 1 to an external device. A current flows in the opposite direction during charging.

An insulator 180 and an external terminal 190 are provided outside the sealing plate 140. The external terminal 190 is electrically connected to an external device, such as an inverter or motor.

The conductive member 130 and the reversal plate 120 are arranged coaxially with each other. In addition, the conductive member 130 and the reversal plate 120 are bilaterally symmetrical in shape.

The conductive member 130 and the reversal plate 120 are welded to each other along a welding seam 122 and are therefore fixed to each other. The welding seam 122 is provided along the circumference edge of the reversal plate 120. The welding seam 122 is formed by melting the conductive member 130 and the reversal plate 120 together to form a solid solution.

When the internal pressure of the battery case 30 increases, the pressure sensing surface 121 is pressed by the gas in the battery case 30. At this time, the pressure of the gas is applied uniformly to the entire pressure sensing surface 121. Because the thin wall portion 111 has lower rigidity than other portions, the thin wall portion 111 is broken and the reversal plate 120 moves in a direction away from the collector terminal 101. Then, the collector terminal 101 is separated from the reversal plate 120 and the electrical continuity between them is interrupted.

Figure 4:
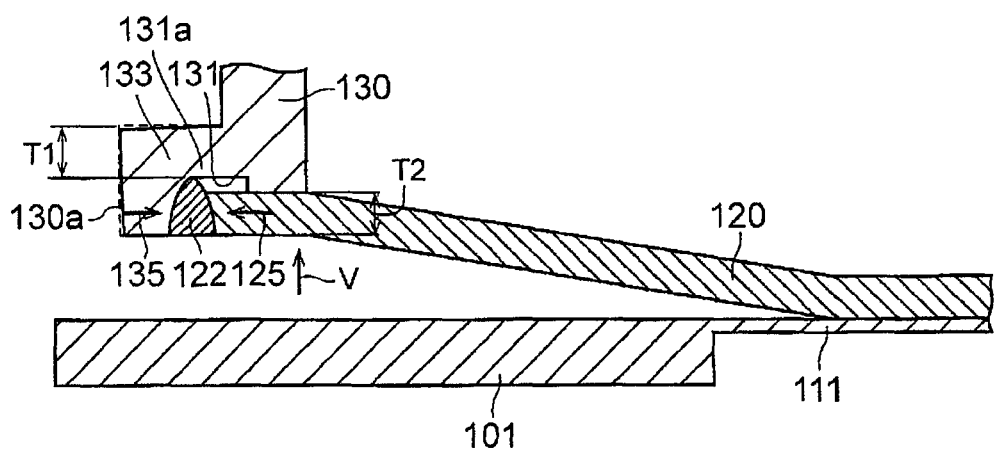
FIG. 4 is a cross-sectional view that shows, in an enlarged manner, a welding point between a conductive member and a reversal plate of the secondary battery that is shown in FIG. 3.

FIG. 4 is a cross-sectional view that shows, in an enlarged manner, a welding point between a conductive member and a reversal plate of the secondary battery that is shown in FIG. 3. Referring to FIG. 4, the welding seam 122 is welded at a high temperature and then solidified. At this time, the welding seam 122 shrinks, and stresses in the directions that are indicated by arrows 125 and 135 are generated. T1/T2 is set to be smaller than 1.5, and T1 is set to be a small value. As a result, an end portion 133 of the conductive member 130 is deformed. The end portion 133 is deformed from the position that is indicated by dotted lines to the position that is indicated by solid lines. Because the end portion 133 side is deformed, the position of the reversal plate 120 remains unchanged. In other words, the end portion 133 of the conductive member 130 can absorb distortion.

Figure 5:
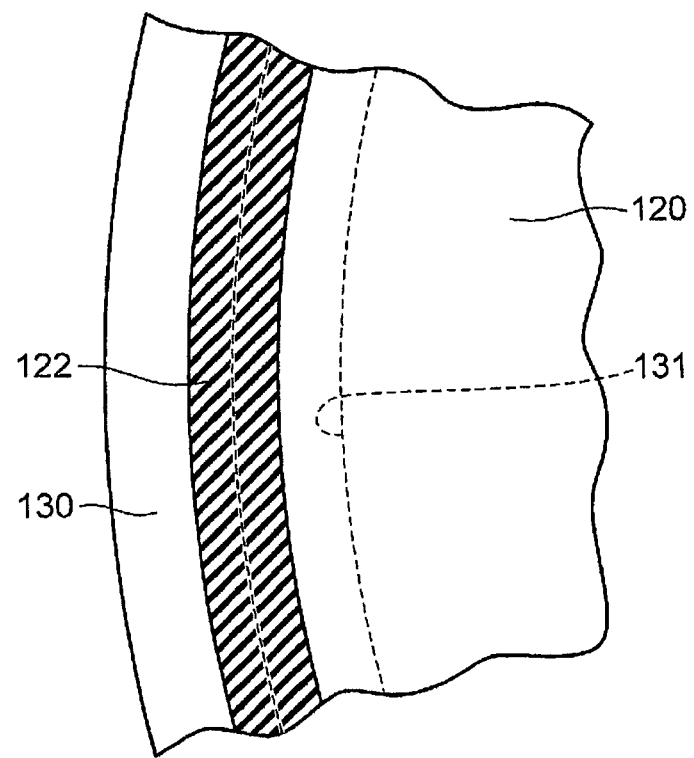
FIG. 5 is a diagram of the reversal plate and the conductive member as seen in the direction that is indicated by an arrow V in FIG. 4.

FIG. 5 is a diagram of the reversal plate and the conductive member as seen in the direction that is indicated by an arrow V in FIG. 4. Referring to FIG. 5, the welding seam 122, which has an annular shape, is formed along the circumference edge of the disk-shaped reversal plate 120. The welding seam 122 is provided in such a position that it overlaps a groove-shaped recess 131 so that the gas that is generated during welding can escape through the recess 131. In this embodiment, both the recess 131 and the welding seam 122 are both provided in an annular shape.

Figure 6:
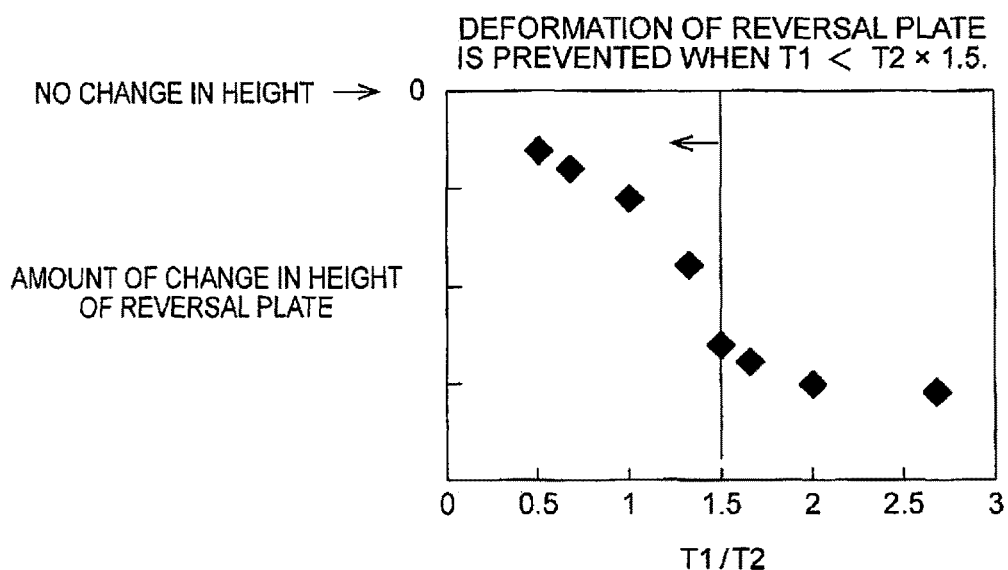
FIG. 6 is a graph that shows the relationship between T1/T2 and the amount of change, in the height of the reversal plate.

FIG. 6 is a graph that shows the relationship between T1/T2 and the amount of change in the height of the reversal plate. Referring to FIG. 6, it was investigated how the height of the reversal plate 120 varied when T1/T2 was variously changed. T2 was set to be in the range of 0.1 mm or greater and 1.0 mm or smaller.

It is apparent that the amount of change in the height of the reversal plate was smaller as the T1/T2 was smaller. This is because the position of the reversal plate 120 remained unchanged since T1 was so small that the end portion 133 of the conductive member 130 had low rigidity and was therefore easily deformed. In contrast, when T1/T2 was equal to or greater than 1.5, the height of the reversal plate 120 was changed because the end portion 133 of the conductive member 130 had high rigidity and was therefore deformed less easily.

In addition, it was confirmed that a similar tendency appeared when the thickness T2 of the reversal plate 120 was in the range of the thickness of reversal plates of ordinary secondary batteries.

Figure 7:
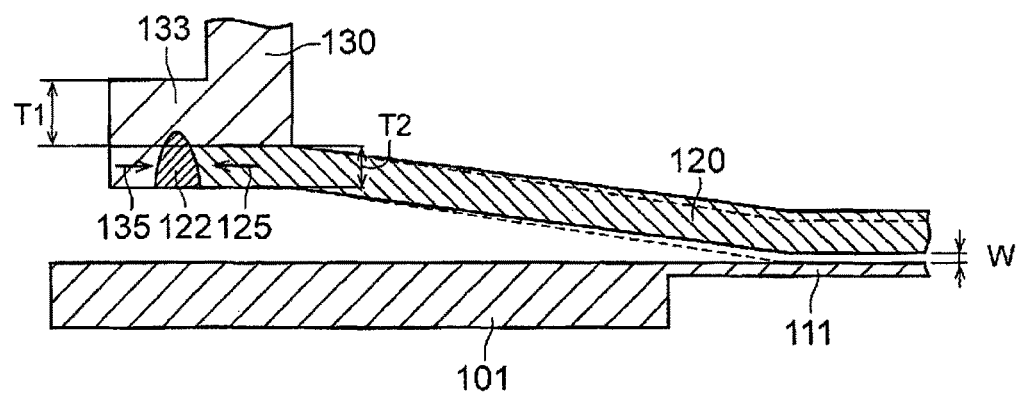
FIG. 7 is a cross-sectional view that shows, in an enlarged manner, a welding point between a conductive member and a reversal plate of a secondary battery according to a comparative example.

FIG. 7 is a cross-sectional view that shows, in an enlarged manner, a welding point between a conductive member and a reversal plate of a secondary battery according to a comparative example. Referring to FIG. 7, T1/T2 is set to be 1.5 or greater in the configuration according to the comparative example. In this case, the end portion 133 of the conductive member 130 has high rigidity and is therefore deformed less easily. As a result, the stress that is caused by solidification shrinkage as indicated by an arrow 125 is transmitted to the reversal plate 120 and the height of the reversal plate 120 is changed. As a result, a gap W is formed between the reversal plate 120 and the thin wall portion 111. The formation of the gap W causes variations in welding quality when the reversal plate 120 and the thin wall portion 111 are welded to each other, resulting in welding defects.

The secondary battery 1 according to this embodiment includes a conductive member 130 that is provided in the secondary battery 1 and serves as a connecting member, and a current interrupt device 105 that is provided in the secondary battery 1 and has a reversal plate 120 that is welded to the conductive member 130. The conductive member 130 and the reversal plate 120 have thicknesses of T1 and T2, respectively, in the part in which the conductive member 130 and the reversal plate 120 are opposed to and in contact with each other, and the thicknesses T1 and T2 satisfy the relationship T1/T2<1.5.

In a secondary battery that is configured as described above, because the thickness T1 of the conductive member 130 is small, even when solidification shrinkage occurs after welding, the conductive member 130 can be deformed to absorb distortion. As a result, the reversal plate 120 can be prevented from moving out of place and the operating pressure of the current interrupt device 105 can be therefore stabilized to a constant value. As a result, improvement in yield and quality can be achieved.

In addition, reducing the thickness of the end portion 133 of the conductive member 130 is effective in reducing the escape of heat from the welding seam 122 and therefore enables the amount of heat input to be reduced when the welding is carried out. Thus, the amount of distortion that is produced can be reduced and the amount of deformation of the reversal plate 120 can be therefore further reduced.

When the recess 131 is provided, the deformation moment radius increases. Specifically, as shown in FIG. 4, when the end portion 133 is deformed in such a manner that it moves along an arc under the stress that is indicated by an arrow 135, the distance (moment radius) from the rotation center 131a to the arrow 135 is longer when the recess 131 is provided compared to when the recess 131 is not provided. As a result, the end portion 133 becomes more deformable.

In addition, because the conductive member 130 and the reversal plate 120 are in contact with each other at a position inside the recess 131 of the conductive member 130, the reversal plate 120 is reversed in shape through a pivoting motion about the contact edge therebetween when the internal pressure increases. When the conductive member 130 and the reversal plate 120 are not in contact with each other at this position, the reversal plate 120 is reversed in shape through a pivoting motion about the welding seam 122. However, the position of the pivot point may be different and the operating pressure may vary significantly depending on the welded condition. Thus, to prevent variations of the operating pressure, the conductive member 130 and the reversal plate 120 are preferably in contact with each other at a position inside the welding seam 122.

It may be possible to use a conductive member 130 that has a thin tip portion 130a so that the end portion 133 can be deformed easily. This, however, leads to a decrease in welding quality between the conductive member 130 and the reversal plate 120. In addition, when the tip portion 130a has a small width in the direction of the arrow 135, another problem may occur. For example, when the laser beam that is used for the welding is deflected away from the conductive member 130 and emitted onto the holder 160, the resin may be burned.

Second Embodiment

Figure 8:
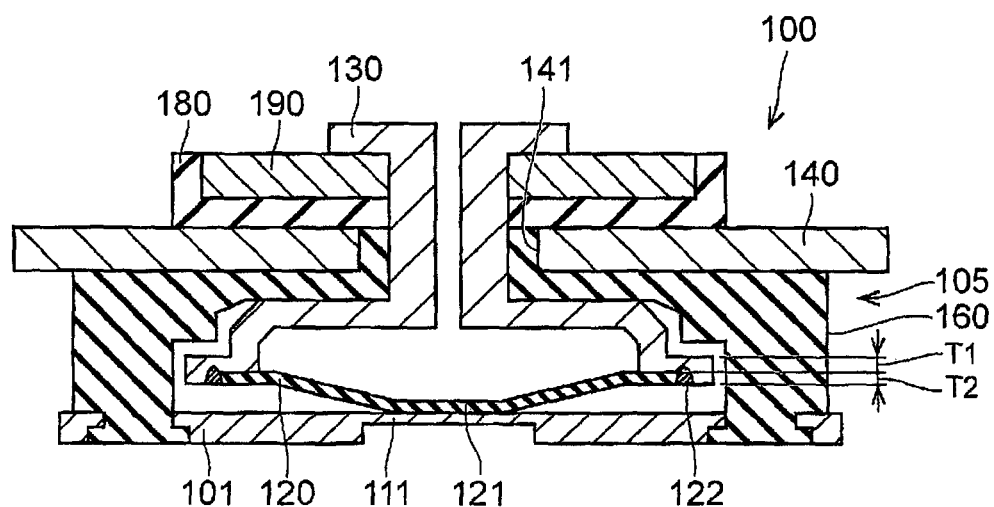
FIG. 8 is a cross-sectional view of a positive electrode of a secondary battery according to a second embodiment.

FIG. 8 is a cross-sectional view of a positive electrode of a secondary battery according to a second embodiment. Referring to FIG. 8, the positive electrode 100 of the secondary battery according to the second embodiment is different in structure from the positive electrode 100 according to the first embodiment in that the conductive member 130 has no recess. The recess 131 does not necessarily have to be provided. Compared to the first embodiment, the conductive member 130 and the reversal plate 120 are in contact with each other over a larger area in the second embodiment. In the region in which the conductive member 130 the reversal plate 120 are in contact with each other, the ratio T1/T2 of the thickness of the conductive member 130 to the thickness of the reversal plate 120 is set to be lower than 1.5.

Third Embodiment

Figure 9:
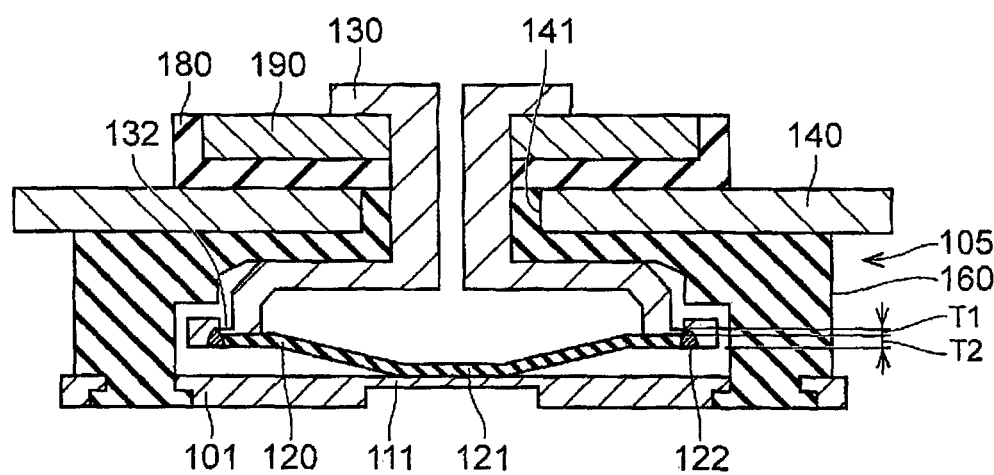
FIG. 9 is a cross-sectional view of a positive electrode of a secondary battery according to a third embodiment.

FIG. 9 is a cross-sectional view of a positive electrode of a secondary battery according to a third embodiment. Referring to FIG. 8, the positive electrode 100 of the secondary battery according to the third embodiment is different in structure from the positive electrode 100 according to the first embodiment in that the conductive member 130 has a recess 132 in a surface on the opposite side thereof from the surface in contact with the reversal plate 120. Compared to the first embodiment, the conductive member 130 and the reversal plate 120 are in contact with each other over a larger area in the third embodiment. In the region in which the conductive member 130 and the reversal plate 120 are in contact with other, the ratio T1/T2 of the thickness of the conductive member 130 to the thickness of the reversal plate 120 is set to be lower than 1.5.

While embodiments of the present invention have been described in the foregoing, the embodiments which have been herein shown can be modified in various ways. First, the secondary battery 1 is not necessarily a lithium secondary battery but may be any of various types of secondary batteries that have an electrolytic solution. In addition, the secondary battery can be used in various applications such as in-vehicle devices, stationary devices and portable devices. Further, while the structure of the positive electrode 100 has been described, a similar structure may be employed on the negative electrode 200 side.

It should be understood that the embodiments that are disclosed herein are not limitative but illustrative in all respects. The scope of the present invention is defined not by the above description but by the appended claims, and is intended to encompass all modifications within the meaning and range equivalent to the claims.

The present invention can be used in the field of secondary batteries having a current interrupt device.

The invention claimed is:
1. A secondary battery, comprising:
 a conductive member that is provided in the secondary battery, and
 a current interrupt device that is provided in the secondary battery and has a reversal plate that is welded to the conductive member,
 a collector terminal that includes a thin wall portion, and
 a battery case in which the collector terminal is disposed, wherein
 the reversal plate has a pressure sensing surface that is welded to the thin wall portion of the collector terminal, the conductive member has a diameter that increases in the battery case from an upper part of the battery case toward a lower part of the battery case, a large diameter portion of the conductive member has a welding seam to which the reversal plate is welded, the welding seam is provided along a circumferential edge of the reversal plate, an end portion of the conductive member is a portion extending to an outer circumference of the large diameter portion of the conductive member, the end portion of the conductive member has a recess in a surface that is in contact with the reversal plate, and the welding seam overlaps the recess, a bottom portion of the recess of the end portion of the conductive member and the reversal plate have thicknesses of $T1$ and $T2$, respectively, in a part in which the end portion of the conductive member and the reversal plate are opposed to each other in a vertical direction of the batter case, and the thicknesses $T1$ and $T2$ satisfy the relationship $T1/T2<1.5$, so that the end portion of the conductive member is deformed by a stress created by a formation of the welding seam, and the welding seam is formed to penetrate the reversal plate in a thickness direction.

2. The secondary battery according to claim 1, wherein $T2$ is 0.1 mm or greater and 1.0 mm or smaller.

\* \* \* \* \*